United States Patent [19]
Maistrelli et al.

[11] 3,864,916
[45] Feb. 11, 1975

[54] HYDROSTATIC TRANSMISSIONS FOR MOTOR VEHICLES

[75] Inventors: Roger A. Maistrelli; Francois C. Pruvot; Henri Poletti, all of Billancourt, France

[73] Assignees: Regie Nationale Des Usines Renault, Billancourt; Automobiles Peugeot, Paris, both of France

[22] Filed: July 23, 1973

[21] Appl. No.: 381,519

[30] Foreign Application Priority Data
Sept. 25, 1972 France .......................... 72.33843

[52] U.S. Cl. ..................... 60/485, 60/491, 60/492
[51] Int. Cl. ..................... F16h 39/10, F16h 39/46
[58] Field of Search ....... 60/19, 420, 443, 444, 490, 60/491, 492, DIG. 10, 485

[56] References Cited
UNITED STATES PATENTS

| | | | |
|---|---|---|---|
| 3,123,975 | 3/1964 | Ebert | 60/443 |
| 3,209,538 | 10/1965 | Kuze | 60/444 |
| 3,443,656 | 5/1969 | Stolz | 60/491 X |
| 3,775,981 | 2/1972 | Molly | 60/490 |

*Primary Examiner*—Edgar W. Geoghegan
*Attorney, Agent, or Firm*—Stevens, Davis, Miller & Mosher

[57] ABSTRACT

This invention provides an improved and more compact hydrostatic transmission lay-out for a motor vehicle, notably in the case of a thermal engine disposed longitudinally with respect to the vehicle. This hydrostatic transmission for transmitting the power output of a thermal engine to the road wheels of a motor vehicle comprises a main pump, two hydraulic motors, said pump and motors being of the variable-capacity type and adapted to drive a reduction gearing for driving in turn the road wheels of the vehicle, a force-feed pump delivering fluid under pressure to the connecting passages, force-feed and overpressure valves, means for controlling the variation in the volumetric capacity of said pump and motors, a main casing closed by covers and comprising a chamber for receiving the reduction mechanism which opens into the joint face of the casing of said transmission gearing, a pump chamber opening into the opposite face of said main casing, a pair of symmetrical motor chambers opening into side faces of said casing, another chamber for receiving the shafts of said motors and opening into the chamber of said reduction gearing, and an oil reserve sump opening into the lower face of said casing.

14 Claims, 8 Drawing Figures

HYDROSTATIC TRANSMISSIONS FOR MOTOR VEHICLES

The present invention relates in general to transmission mechanisms for motor vehicles and has specific reference to hydrostatic transmissions notably of the type intended for transmitting the mechanical power output of a thermal engine to the traction or drive members of a motor vehicle.

This invention is concerned more particularly to a transmission for a passenger vehicle or automobile having a thermal engine disposed longitudinally with respect to the center line of the vehicle and a differential having its output shafts (which are normally directed to the universal joints) at a lower level than the shaft or crankshaft of the thermal engine.

Hydrostatic transmission mechanisms for transmitting the power output of a thermal engine in order to drive a motor vehicle are known more particularly in the field of public work machines, tractors, etc.

The chief advantage of hydrostatic transmissions is that the transmission ratio, i.e., the ratio of the thermal engine speed to the speed of a member operatively connected to the road or drive wheels of a vehicle, can be varied continuously, from infinity corresponding to the standstill condition of the vehicle to a minimum value corresponding to the maximum speed of the vehicle, so that the maximum advantage can be derived from the engine characteristics under all operating conditions thereof.

As a rule, the use of hydrostatic transmissions is limited by reasons of its cost, sophisticated structure, difficult adjustment and relatively poor efficiency. Hydrostatic transmissions designed for driving motor vehicles comprise a variable-capacity pump driven from the thermal engine and delivering fluid under pressure into one, two or more hydraulic motors having a fixed or variable volumetric capacity, according to cases, the output shafts of these hydraulic motors being operatively connected to the wheel driving members.

The transmission ratio is modified by varying the volumetric capacity of the hydraulic pump and motors. This transmission further comprises a force-feed pump, force-feed or excess-feed valves and overpressure valves, a filter, a reversing gear, etc.

The wheels of the vehicle are driven either directly or through reduction gears, if the lay-out comprises one hydraulic motor per wheel. When the motors are supplied in parallel with fluid under pressure from the pump, they act as a differential.

If the lay-out comprises a single hydraulic motor, the latter drives a conventional differential.

Hydrostatic transmissions comprising two separate hydraulic units interconnected by rigid or flexible external conduits and mounted in a common casing with the aforesaid ancillary members are also known in the art.

A typical transmission of this type comprises a hollow connecting-rod for on the one hand providing the hydraulic connection between the pump and the hydraulic motor and on the other hand constituting a convenient means for adjusting the volumetric capacity of said pump and motor.

Another known transmission is so arranged that the operative members (barrel, pistons, swash-plate, etc.) of the pump and of the hydraulic motor are incorporated in a common casing. The shafts of the pump and hydraulic motor are parallel and the casing cover comprises conduit means for interconnecting the pump and hydraulic motor, as well as overpressure valves and a force-feed or excess-feed pump.

In this transmission, only the pump is of the variable volumetric capacity type, thus limiting its efficiency.

Moreover, the arrangement of the hydraulic motor is such that a bevel pinion must be interposed between this motor and the differential.

Another known transmission lay-out comprises a single casing enclosing a pump of the in-line type, a pair of radial-piston hydraulic motors and the members controlling the variation in the volumetric capacity of the pump and motors.

In this case the pump barrel having its axis parallel to that of the thermal engine is driven therefrom through a pair of reduction gears. Now this arrangement is objectionable in that it increases unduly the over-all dimensions of the transmission. Since the pump revolves at a lower speed than if it were driven directly from the thermal engine, it must deliver a greater output for a given pump driving power, this obviously increasing the overall pump dimensions.

Moreover, the presence of a reduction gearing with its bearings and supports is also a cause of increased volume and cost of the transmission. Besides, this arrangement is not applicable to a lay-out comprising hydraulic machines of the high-efficiency broken-axis type (high speed and output).

In general, this invention is directed to provide a particularly advantageous arrangement of the various component elements of a hydrostatic transmission with a view to reduce its over-all dimensions, improve its efficiency and increase its useful life.

It is the first object of this invention to provide a casing containing a pump and two hydraulic motors of the so-called "broken axis" type, a differential driving pinion shaft and passage means interconnecting said pump and motors which are formed in the walls of said casing.

A second object of this invention consists in providing an advantageous mounting of the hydraulic motors with a view to eliminate any stray thrusts in order to improve the transmission efficiency while preserving the vehicle lay-out, from the differential to the drive wheels, and more generally from any reduction mechanism or gearing to the drive wheels.

It is a third object of this invention to provide on the one hand means for controlling the variation in the volumetric capacity of the pump and hydraulic motors, which are both constructionally simple and economical in operation, said control means being disposed within the casing, and on the other hand electric means for actuating said control means in order to facilitate its adaptation to an electronic regulator.

A fourth object of this invention consists of a space-saving arrangement for a force-feed pump and a circulation pump.

The fifth object of this invention resides in an advantageous disposition for a reversing valve and force-feed and overpressure valves, within the transmission and without resorting to any hydraulic coupling for their assembling.

The hydrostatic transmission according to this invention for transmitting the mechanical power output of a thermal engine to the members driving the road wheels of a motor vehicle comprises a main pump, two hydraulic motors of the barrel-mounted parallel axial piston and broken-axis type, having a variable volumetric capacity, passage means interconnecting said pump and hydraulic motors, a reduction gearing interposed between said motors and the road wheels and driven jointly from said motors, a force-feed or over-feed pump delivering its output into said passage means, force-feed and overpressure valves, members for controlling the variation in the volumetric capacity of said main pump and hydraulic motors, a main casing closed by cover means which is secured to a casing enclosing the reduction gearing secured in turn to the thermal engine structure, the above-specified transmission being characterised in that said main casing comprises essentially:

— a chamber for receiving said reduction gearing, which opens into the assembly or joint face of said reduction-gearing casing;

— a chamber for receiving the main pump which opens into the face opposite said assembly or joint face;

— a pair of chambers each adapted to receive a hydraulic motor, which are disposed symmetrically on either side of the longitudinal vertical plane of said casing which extends centrally of the pump and reduction gearing chambers, said motor chambers opening into the side faces of said main casing;

— a chamber for receiving the hydraulic motors coupling shaft, which interconnects the chamber of said hydraulic motors and opens into the chamber of said reduction gearing, and — an oil reserve sump opening into the lower face of said main casing.

The transmission will now be described more in detail with reference to the attached drawings, in which.

Figure 1:
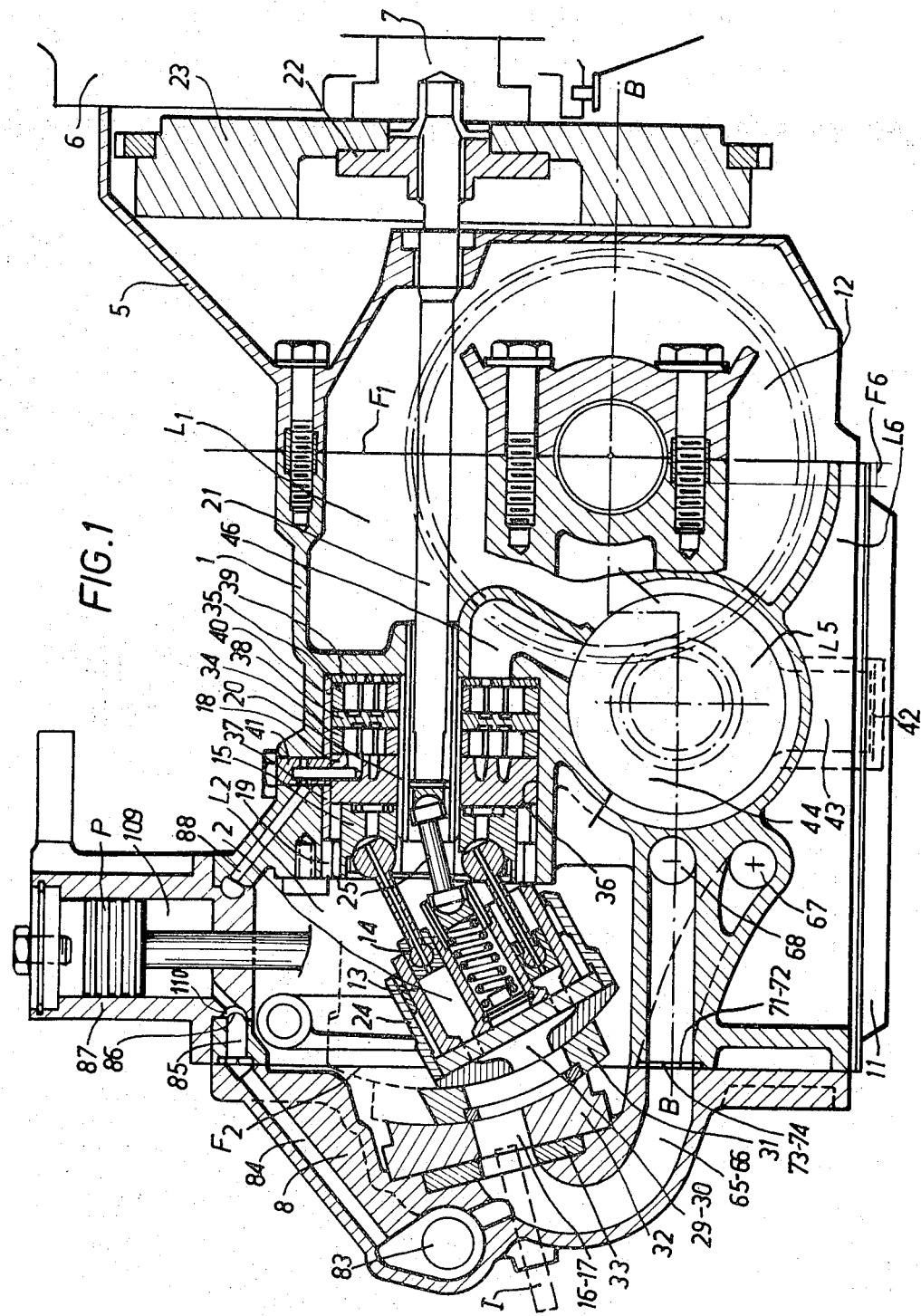
FIG. 1 is a general vertical sectional view of the transmission, the section being taken along the plane $A_1A_1$ of FIG. 2, with fragmentary sections taken along the line $A_3$ of FIG. 5.
Figure 2:
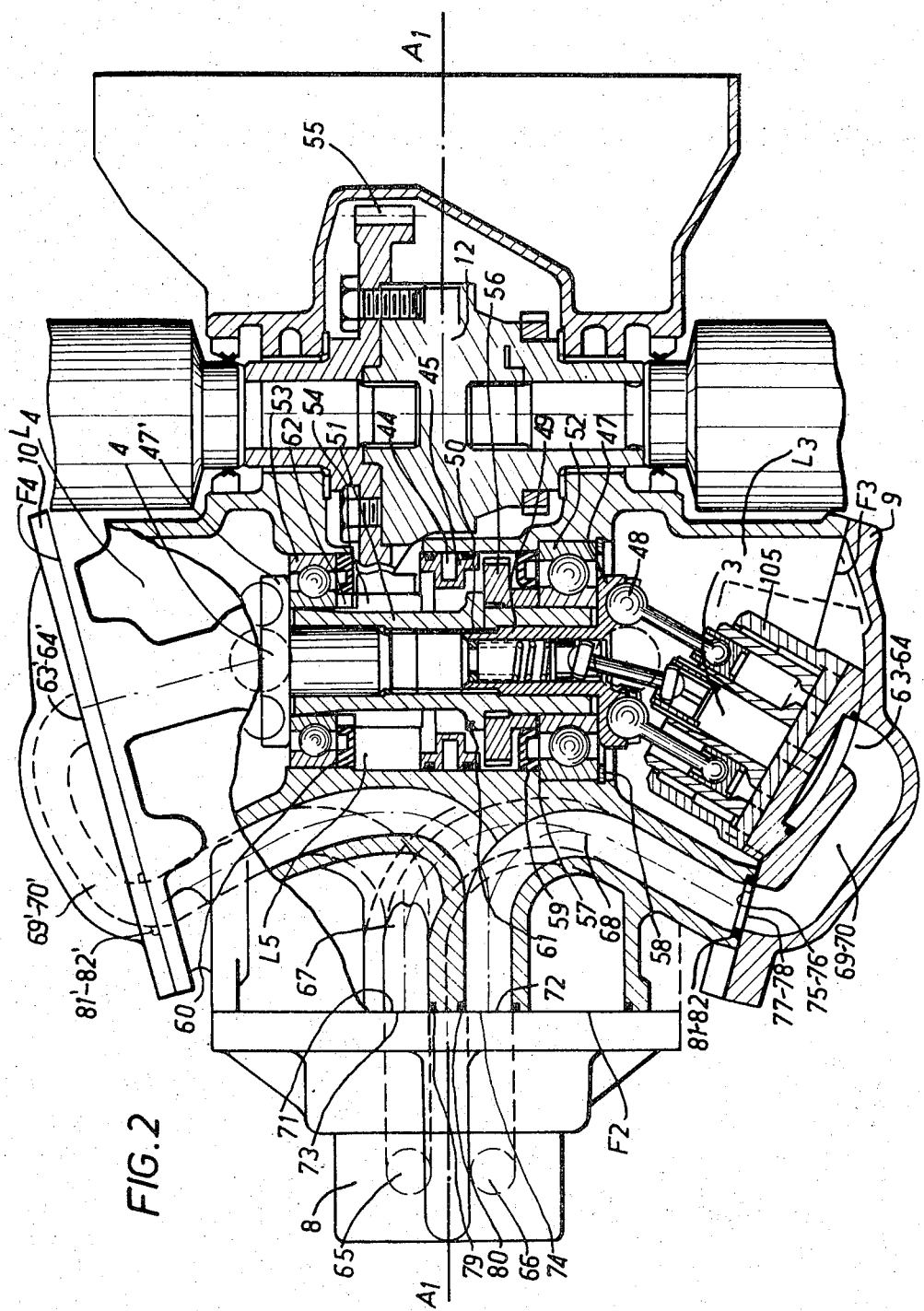
FIG. 2 is a sectional view from above, taken along the line B of FIG. 1.
Figures 6, 7:
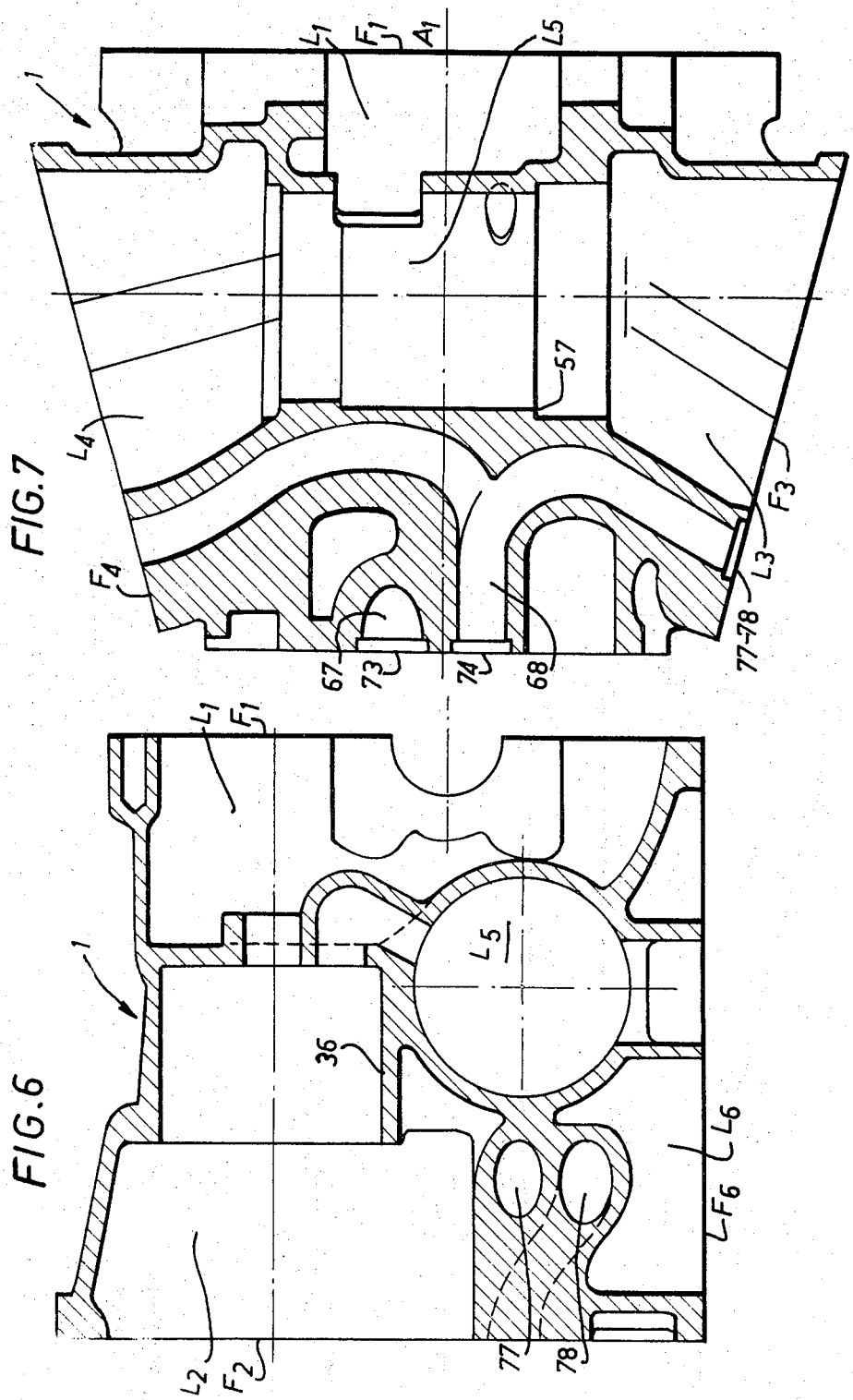
FIGS. 6 and 7 are sectional views of the main casing alone.

Referring first to FIGS. 1 and 2, it will be seen that the hydrostatic transmission according to this invention comprises essentially a main casing 1 in which the main pump 2 and the two hydraulic motors 3 and 4 are housed. This main casing 1 is secured at its joint face $F_1$ to the casing 5 of a reduction gearing, for example a differential, secured in turn to the casing or crankcase of the thermal engine 6. The main casing 1 shown separately and bare in FIGS. 6 and 7 comprises a first chamber $L_1$ for the reduction gearing or like mechanism, for instance a differential, this chamber $L_1$ opening into the joint face $F_1$ for connecting this casing to the differential casing, a second chamber $L_2$ for the main pump 2, which opens into its face $F_2$ opposite said face $F_1$; third and fourth chambers $L_3$, $L_4$ for the hydraulic motors 3 and 4, respectively, which open into its side faces $F_3$, $F_4$ respectively and are disposed symmetrically in relation to a vertical longitudinal plane $A_1$ of the transmission which is also coincident with the central plane of chambers $L_1$ and $L_2$ and further contains the axis, a fifth crankshaft or shaft 7 of the thermal engine, a fifth chamber $L_5$ for the shaft interconnecting said hydraulic motors 3, 4, said fifth chamber $L_5$ interconnecting said third and fourth chambers $L_3$ and $L_4$ and opening into the differential chamber, a sixth chamber $L_6$ opening into the lower face $F_6$ of this main casing and constituting an oil reserve sump.

The main casing 1 is closed by several covers, namely: a first pump cover 8 fitting to the face $F_2$; a pair of motor covers 9, 10 disposed symmetrically and filled to faces $F_3$ and $F_4$, respectively; a bottom oil reserve sump cover 11 fitting to bottom face $F_6$, the last closing member of said casing consisting of the differential casing 5 fitting to the face $F_1$.

It is thus obvious that the transmission according to this invention is intended preferentially for an automotive vehicle equipped with a thermal engine disposed longitudinally and comprising a conventional differential mechanism 12.

The main pump 2 and hydraulic motors 3, 4 are already known in the art and reference may be had in this respect to the U.S. Pat. No. 3,589,244; therefore, a detailed description of these units is not deemed necessary for a proper understanding of this invention. However, it will be noted that these pump and motors comprise piston barrels 13 with axial pistons 14 of the broken-axis type and that their volumertric capacity is variable by modifying the barrel inclination in relation to the impeller plate 15 and comprising suction and delivery ports 16, 17 formed in the end cover 8.

The impeller plate 15 reacts against an axial bearing 18 and a radial bearing 19. The impeller plate 15 is rotatably driven through a shaft 20 driven in turn by a shaft 21 coupled to the thermal engine via an intermediate member 22 secured to the inertia flywheel 23. The barrel 13 revolves in a barrel carrier 24 pivoting about the axis 25 of a pair of cavities 26, 27 (FIG. 4) formed in the main casing 1, with the interposition of needle bearing sockets 28. The orifices 29, 30 through which the oil is allowed to escape from the barrel carrier 24 are connected to the ports 16 and 17 via sliding seal 31 and an intermediate plate 32 secured to the cover 8 as disclosed and illustrated in the U.S. Pat. appln. Ser. No. 139,079 filed on Apr. 30, 1971 now abandoned. An output reversing valve 33 of the type disclosed in another U.S. Pat. appln. Ser. No. 209,590 filed on Dec. 20, 1971 now U.S. Pat. No. 3,799,033, issued Mar. 26, 1974 is responsive to a shaft 1 and is adapted to reverse the fluid connection between ports 16, 17 on the one hand and orifices 29, 30 on the other hand. The shaft 20 driving the impeller plate 15 of the main pump drives at the same time the rotors of a forcefeed or overfeed pump 34 and of a filling pump 35 for the casing and oil circulation system.

These pumps 34, 35 are of the blade or roller type. Pump 34 may be of the variable volumetric capacity type and equipped with means for regulating its delivery pressure as described in the U.S. Pat. No. 3,642,388. The filling pump 35 may be of the fixed volumetric capacity type for its delivery pressure is substantially zero and does not involve a loss of power.

The bearings 18, 19 and pump bodies 34 and 35 are mounted in series in a bore 36 of chamber $L_2$ of the main casing, with a distance-piece 37 and the timing plates 38, 39 of pumps 34 and 35, resepectively. Their proper angular position is set by means of a common key 40 and a hollow stud 41 also acting as a delivery passage for the force-feed pump 34.

The suction or induction inlet to pumps 34 and 35 is located in the oil sump and comprises a suction strainer 42 mounted in a pipe 43 cast integrally with the casing 1. The annular space 44 formed by the seal 45 (FIG. 2) in chamber $L_5$ of the shaft interconnecting said motors 3, 4, and the passage 46 supplying fluid to the filling pump are also formed integrally with the casing 1.

The output of filling pump 35 is fed to chamber $L_2$ of the main pump via a groove (not shown) formed in the outer periphery of members 18, 34 and 38.

Referring now to FIG. 2, it will be seen that the hydraulic motors 3, 4 are technologically similar to the main pump 2. Nearly all the component elements of these motors are strictly indentical with those of the pump, and this is obviously attended by a substantial reduction in the investment necessary to build and install the equipment.

The essential difference between the pump 2 and motors 3, 4 lies in the absence of a sliding seal 31 and in the impeller plates 47, 47' which are free of inherent axial and radial bearings.

The impeller plates 47, 47' comprise a cylindrical hollow stem 49 terminating with a splined portion 50 whereby they can be fitted in a hollow shaft 51 or be rotatably rigid with this shaft. The shaft 51 supported by a pair of ball-bearings 52, 53 comprises a helical pinion 54 for driving the crown wheel 55 of the differential mechanism 12 and receives a notched disc 56 for the parking brake. The shaft 51 is disposed in axial relationship to the outer race of bearing 52, fitted between a shoulder 57 of chamber a $L_5$ and a circlip 58. This mounting further comprises a pair of packings 59, 60 which may consist simply of a metal washer having a moderate radial clearance, since the fluid-tightness is not a strict requirement in this case.

The axial thrust of swash plate 47 is transmitted to shaft 51 via the inner race of bearing 52 and the notched disc 56 reacting against a shoulder 61 of shaft 51; it is balanced by the axial thrust of impeller plate 47', transmitted to said shaft 51 via the inner race of bearing 53 and another race 62 reacting against the pinion 54 of shaft 51. Since the volumetric or cylinder capacities of motors 3, 4 are constantly identical, as will be explained presently, the axial thrust of said plates 47 and 47' are perfectly balanced. The residual axial want of balance of shaft 51, due to the axial component of the tooth thrust exerted on pinion 54, is absorobed by bearings 52 and 53. The radial thrusts of plates 47 and 47' and the radial component of the tooth thrust exerted on pinion 54 are absorbed by bearings 52 and 53.

The suction and delivery ports 16, 17 respectively of main pump 2 are connected to the inlet and exhaust ports 63, 64 respectively of motor 3 and also to the corresponding ports 63' and 64' respectively of motor 4 via a pair of passages 65, 66 formed in cover 8 ; a pair of passages 67, 68 formed in the main caisng 1; and another of passages 69, 70 and 69', 70'formed in covers 9 and 10, respectively. Passages 65, 66 open into ports 71, 72 formed in the face of cover 8 and register with orifices 73, 74 respectively of passages 67 and 68 opening into the face $F_2$ of casing 1. Passages 69, 70 of cover 9 open into the face $F_3$ of this cover via orfices 75, 76 registering with orifices 77, 78 of passages 67 and 68 in the face $F_3$ of casing 1. Seals 79, 80, 81, 82, 81' and 82' provide the necessary fluid-tightness between the casing 1 and covers 8, 9 and 10 at the joints of said passages. Passages 65, 66 of cover 8 are connected to safety valves and force-feed valves designated in general by the reference numeral 83 and housed in the cover 8, according to the disclosure of the U.S. Pat. appln. Ser. No. 224,553 filed on Feb. 8, 1972. These passages 65, 66 are connected to the forced feed pump 34 via another passage 84 formed in said cover 8, a passage 85 formed in casing 1, the groove 86 formed in the actuator or cylinder body 87, passage 88 in casing 1, hollow stud 41 and passages formed in bearing 18.

Figure 3:
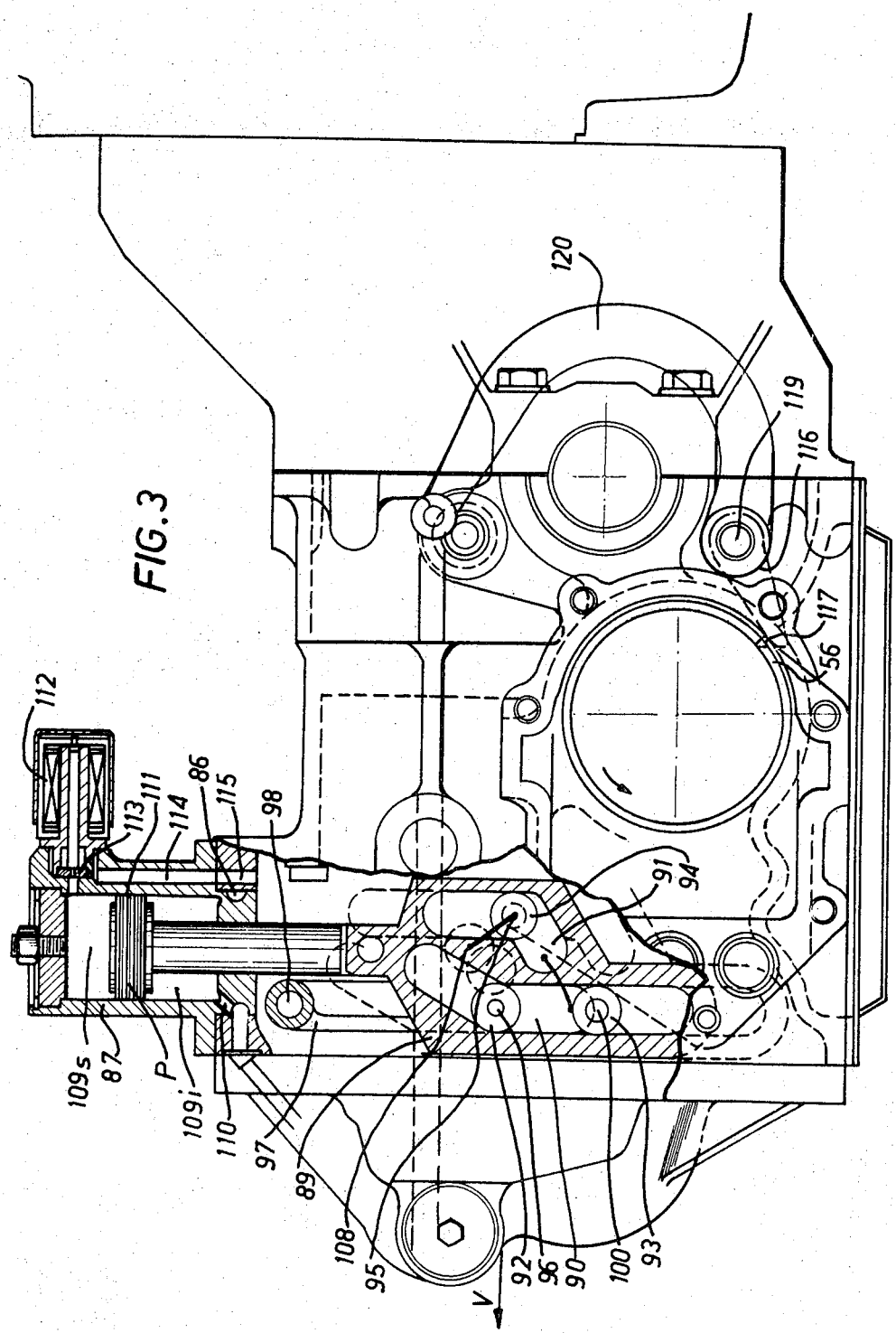
FIG. 3 is a fragmentary section taken in the direction $D_1$ of FIG. 4.
Figure 4:
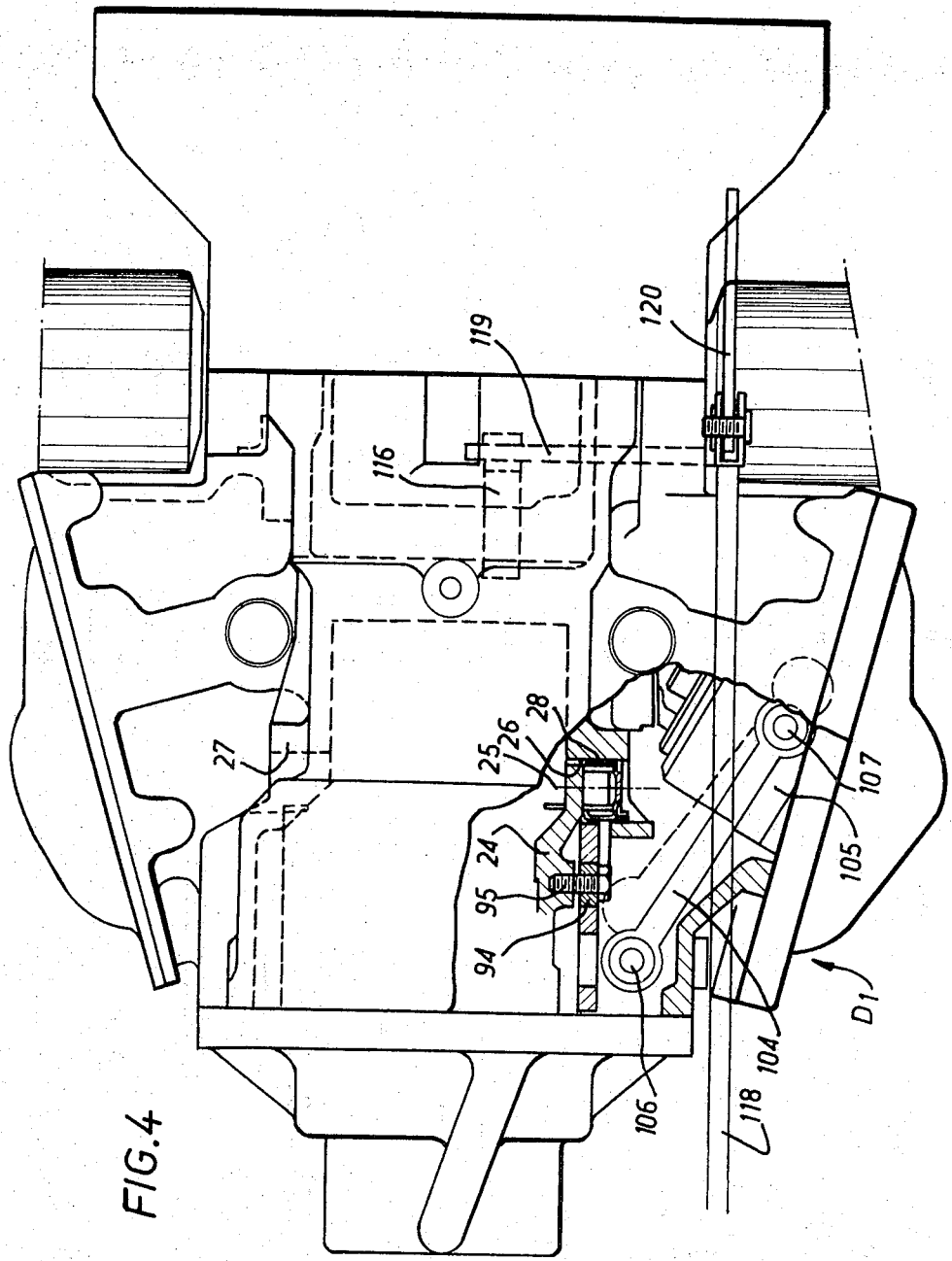
FIG. 4 is a plane view from above with a fragmentary section.
Figure 5:
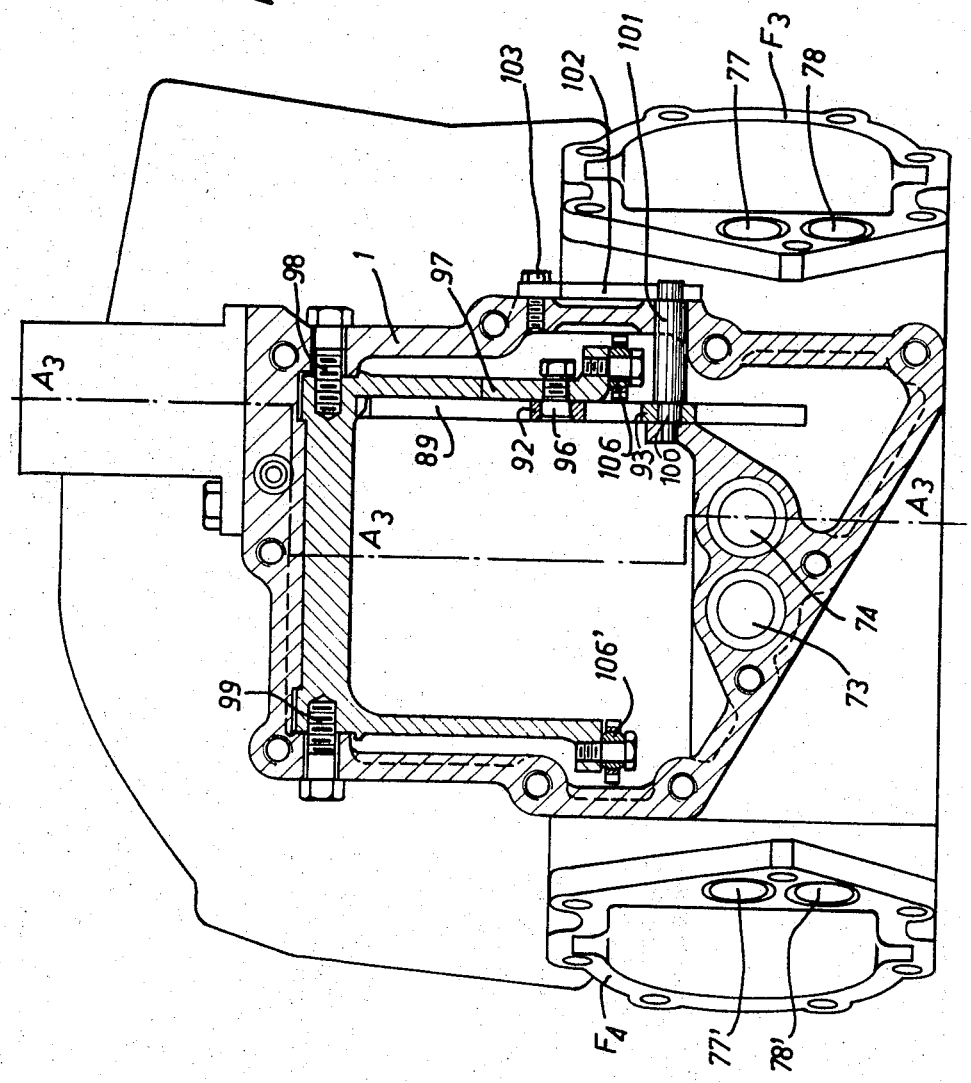
FIG. 5 is a front view taken in the direction $F_2$ (FIG. 1) of the main casing, the covers being removed therefrom to facilitate the understanding of the casing structure.

The actuator 87 mounted directly to the casing 1 controls the variation in the volumetric capacity of the main pump 2 and also that of the hydraulic motors through the medium of members to be described presently with reference to FIGS. 3, 4 and 5.

The rod of piston P is coupled to a slide 89 consisting of a punched plate comprising a pair of guide grooves 90, 91 engaged by three rollers 92, 93 and 94 of the needle type, known per se. Roller 94 revolves about a pivot pin 95 rigid with the barrel carrier 24 of main pump 2. Roller 92 revolves about another pivot pin 96 rigid with a strap 97 fulcrumed about a pair of pivot pins 98, 99 rigid with casing 1. Roller 93 adapted to guide the slide 89 revolves about a pivot pin located eccentrically in relation to a shaft 101 rotatably mounted in the casing 1. The position of roller 93 is adjustable from outside by means of a crank 102 comprising a set or lock screw 103. A pair of links 104, 104' are provided for rigidly connecting the strap 97 to the barrel carriers 105, 105' of hydraulic motors 3, 4 respectively via ball-and-socket joints 106, 107, 106' and 107', whereby the inclination of said strap 97 will produce a corresponding change in the cylinder or volumetric capacity of both motors 3, 4.

The shape of the guide grooves 90, 91 formed in said slide 89 permits adjusting the cylinder capaicty of pump 2 and motors 3, 4 as a function of the movement of the rod piston P according to a predetermined law. Thus, more particularly, the capacity of pump 2 may be varied from zero to its maximum value. This corresponds to the law selected for the specific form of embodiment illustrated in FIG. 3. When the rod of actuator 87 is fully retracted, the roller 94 is in its uppermost position 108 and the barrel carrier 24 is at zero inclination, shown in dash lines in FIG. 1. The roller 92 remains in its position like the strap 97 so that the hydrualic motors 3, 4 are in their maximum cylinder capacity condition. When the piston rod is caused to emerge from the actuator body, the cylinder capacity of the motors remains at its maximum value, since roller 92 is positioned in a portion of groove 90 parallel to the direction of movement of slide 89. On the other hand, the roller 94 initially in the inclined portion of groove 91 gradually moves from position 108 to the position shown in FIG. 3, which corresponds to the maximum volumertic capacity of pump 2.

If the actuator piston rod continues its outward movement with respect to the body 87, the pump will retain its maximum volumetric capacity for the roller 94 will engage the portion of goove 91 parallel to the movement of slide 89. On the other hand, the roller 92 engages the inclined ramp of groove 90 so that it moves gradually in the opposite direction to the arrow V, together with strap 97, thus reducing the inclination of barrel carriers 105 and therefore of the cylinder capacity of the hydraulic motors. The movement of the piston rod of actuator 87 is subordinate to the pressure prevailing in the major chamber 109s of this actuator.

The small chamber 109i of this actuator is constantly supplied with fluid under pressure by the force-feed pump 34 via a passage 110 connecting the minor chamber 109i to groove 86. Groove 111 surrounding piston P permits supplying fluid to the upper chamber 109s of actuator 87. A solenioid-operated valve 112 of a type known per se is provided for regulating the pressure in said chamber 109s by adjusting the cross-sectional passage area of a leakage orifice 113 as a function of the electric control current. The hydraulic fluid escaping from chamber 109s via orifice 113 flows back into casing 1 via passage 114 of the actuator body 87 via another orifice 115 of casing 1.

The actuator movements may also be controlled by means of a pair of solenoid-operated valves similar to valve 112, the first valve connecting the chamber 109s to the source of force-feed pressure the second valve connecting the chamber 109s to the sump when these valves are energized. This method, through somewhat more expensive, is advantageous in that it holds the actuator in a stable position in case of failure in the energizing current supply.

FIGS. 3 and 4 also show the members permitting controlling the parking brake. A first lever 116 disposed in chamber $L_1$ is rotatably mounted to a pivot pin 119 and has its end 117 engaged in a notch of the disc 56 rigid with the shaft of said hydraulic motors (FIG. 2). This lever 116 is actuated by another curved lever 120 having fulcrumed thereto a third lever 118 connected to the selector mounted to the instrument panel of the vehicle. To this end, an orifice permitting the fluid communication between chambers $L_1$ and $L_5$ is utilized.

The control of lever 120 may easily be combined with that of lever I controlling the direction of fluid flow through the pump 2.

In the above-described form of embodiment it will be seen that the inner volumes of the casing which correspond to the pump chamber $L_2$ and to the hydraulic motor chambers $L_3$ and $L_4$ are interconnected through the passages provided for the links 104 and 104', but these chambers are separated from the other chambers and notably from the lower portion constituting the oil sump by means of leakage-limitng elements. In fact, the pump chamber is connected to the differential chamber only through the shaft 20 driving the plate 15 of said pump. The axial bearing 18 may have a limited play, and a helical oil groove formed on shaft 20 and having the proper orientation (considering the direction of rotation of this shaft) permits limiting the leakage of fluid from the pump chamber $L_2$ to the differential.

The chambers $L_3$ and $L_4$ of motors 3 and 4, connected to the chamber $L_2$ of pump 2 via the passage formed in links 104, 104' are closed at the level of impeller plates 47, 47' by seals 59 and 60 (FIG. 2). The filling pump 35 delivering fluid to the chamber $L_2$ of pump 2 this chamber and those of motors 3 and 4 are filled during the operation of the vehicle.

When the thermal engine is stopped, the chambers $L_2$, $L_3$ and $L_4$ will be drained gradually. The casing 1 has an outlet orifice (not shown) in the upper portion of the main pump chamber $L_2$ constituting an overflow device. The fulid may be returned to the sump through an external conduit or pipe, or through a passage cast integrally with the casing. The overflow outlet may if desired be connected to a filter and cooling means.

It will also be seen that the filling pump 35 may if desired be disposed at another location in the casing and be driven from an electric motor energized when the driver of the vehicle turns on the ignition key.

The arrangement of this invention is characterised by the following advantageous features :
— the main casing 1 closed by covers 8, 9 and 10 is adapted to receive the pump, the hydrualic motors, the shaft of the pinion driving the differential, and all the passages for the fluid under pressure are incorporated in the walls of the casing and covers. Thus, the first object of this invention is obtained;
— the opposite mounting of swash plates 47 and 47' of the hydraulic motors in a common shaft 51 permits balancing the axial thrusts of said plates and dispensing with the relevant bearings. As a result, the efficiency and useful life of the transmission are improved considerably, and this constitutes the second object of this invention;
— the means for adjusting the volumetric capacities of the pump 2 and motors 3, 4, which comprise essentially the slide 89, strap 97 and links 104, 104' are located inside the casing 1. The electric control means comprising the solenoid-operated valve 112 and actuator 87 is relatively simple, takes litter space and permits displaying different adjustment laws by modifying the guide grooves 90 and 91, thus providing the thrid object of this invention;
— furthermore, the force-feed pump 34 and filling pump 35 require very little space, according to a fourth object of this invention;
— similarly, the reversing vlave 33 and the force-feed and overpressure valves 83 are incorporated in the cover 8, thus requiring little space and no external hydraulic piping or like conduit means, according to the fifth object of this invention;
— a complementary feature is that the machining operations to be carried out on the casing 1 are relatively simple, since they can easily be performed by using mass-production transfer machines. Thus, for instance, the stepped longitudinal profile of chamber $L_5$ and of the bottom of chamber $L_2$ permit machining all the diameters simultaneously by using a multiple-tool spindle;
— finally, it will be seen that the mounting is simple, especially that of the hydraulic units which can be assembled separately as sub-units and then mounted in the casing.

Figure 8:
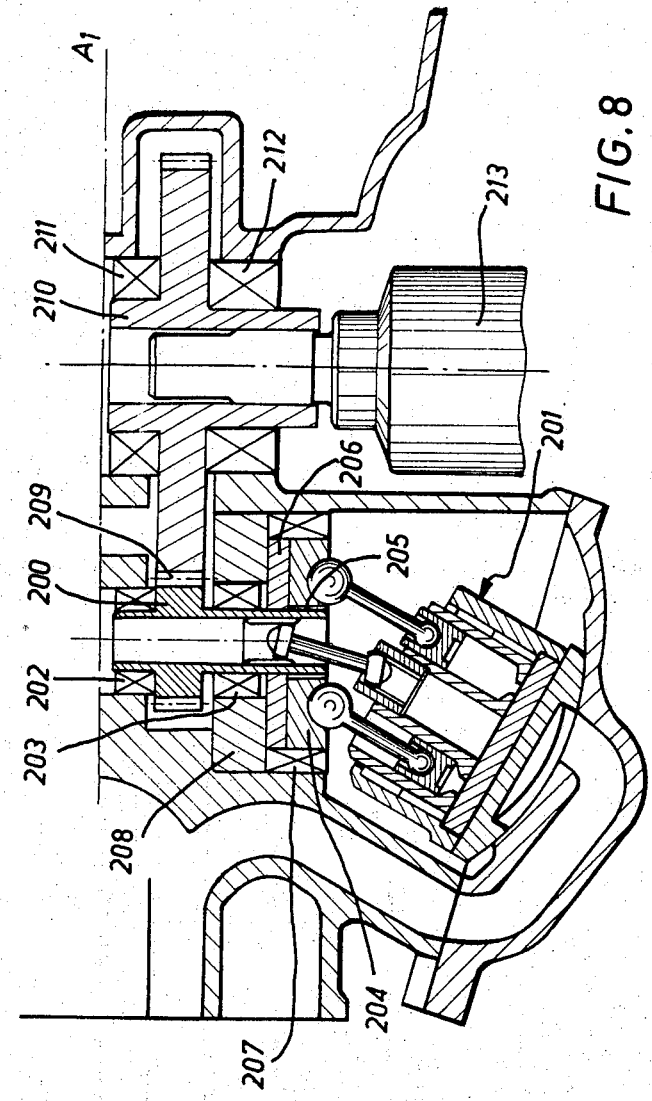
FIG. 8 is a modified form of embodiment of the transmission, which applies to the reduction gearing.

According to a modified form of embodiment of the reduction gearing illustrated in FIG. 8, the shafts 200 of the hydraulic motors 201 are independent of each other and carried by a pair of bearings 202, 203; these shafts are driven by means of splines 205 from the impeller plates 204 identical with the plate 15 of the main pump. As in the case of this main pump the plates 204 have axial bearings 206 and radial bearings 207. Each bearing 206 reacts against the casing through the medium of a plate 208. Each shaft 200 has teeth 209 formed thereon which mesh with the corresponding teeth of a reduction pinion 210 carried by a pair of bearings 212, 211 and this pinion 210 is connected directly to the wheel driving members 213.

The motors 201, shafts 220, pinions 209, 210 and bearings are disposed symmetrically in relation to the above-defined plane $A_1$.

This modified form of embodiment is advantageous in that it permits dispensing with the mechanical differential. The hydraulic motors fed in parallel through the above-described passages operate as a differential.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed is:

1. Hydrostatic transmission for transmitting the mechanical power output of a thermal engine to the members driving the drive wheels of a motor vehicle, which comprises a main pump, two hydraulic motors, all three of the type comprising axial parallel pistons mounted in a common barrel of the broken axis and variable volumetric capacity type, duct means for interconnecting said hydraulic pump and motors, a reduction mechanism for dirving the wheels which is driven jointly from said hydraulic motors, a pump for over-feeding said connecting duct means, force-feed and overpressure valves, members for controlling the variation in the volumetric capacity of said main pump and hydraulic motors, a main casing closed by covers and secured to a casing of the reduction mechanism which is secured in turn to the thermal engine, said main casing comprising: a first chamber for receiving the reduction mechansim, which opens into the assembly or joint face of said reduction mechanism casing; a second chamber for receiving said main pump, which opens into the face opposite said assembly or joint face; a pair of chambers for said hydraulic motors, respectively, which are disposed symmetrically to a longitudinal vertical plane of said casing which extends centrally of the pump and reduction mechanism chambers, said motor chambers opening into the side faces of said main casing; antoher chamber for receiving the shafts of said hydraulic motors, which interconnects said hydraulic motor chambers and opens into said reduction mehanism chamber, and a further chamber constituting the oil reserve sump which opens into the lower face of said casing.

2. Transmission mechanism as set forth in claim 1, wherein one portion of the fluid connections between the pump and the hydraulic motors consists of passages formed in said main casing and adapted to interconnect two ports located in the faces of the casing chambers intended for receiving said hydraulic motors and symmetrically in relation to the vertical longitudinal plane of said casing, each passage being also connected to one of a pair of ports formed in the face of the casing which corresponds to the pump chamber.

3. Transmission mechanism as set forth in claim 2, wherein said face of said main casing having the pump chamber formed therein is closed by a cover having therein two passages connecting the pump outlet ports to a pair of passages opening into the joint plane of said cover and registering with said ports of the main casing, said last-mentioned ports being formed in the face of the casing which corresponds to the pump chamber.

4. Transmission mechanism as set forth in claim 3, wherein said main casing is closed, on each one of its faces corresponding to the motor chamber, by a cover, each cover having therein a pair of passages connecting the output ports of said motors to the orifices formed in the cover face registering with said ports of said main casing and formed in the faces registering with the chambers of said motors.

5. Transmission mechanism as set forth in claim 4, wherein said main casing carriers an actuator for driving a slide formed with guide grooves disposed in said pump chamber, one groove controlling the variation in the volumetric capacity of the pump, the variation in the volumetric capacity of said motors being controlled jointly by the other groove and by a pair of links connected to a variable-inclination strap surrounding said pump and fulcrumed to a pivot pin rigid with said main casing.

6. Transmission mechanism as set forth in claim 5, wherein said slide control actuator is supplied with hydraulic fluid at the force-feed pressure from the main pump through the internal passages of said casing, and that the actuator movement is adjusted by means of at least one soleniod-operated valve capable of modifying the amount of hydraulic fluid in one chamber of said actuator as a function of energizing signals applied to said valve.

7. Transmission mechanism as set forth in claim 6, wherein said pump cover comprises in a manner known per se a chamber for the reversing valve provided for reversing the direction of flow in the pump between the output ports of the main pump and the passages connecting said output ports to the orifices formed on the face of said cover.

8. Transmission mechanism as set forth in claim 7, wherein said main pump cover has therein a chamber for receiving the force-feed and overpressure valves which is connected to the aforesaid connecting passages of the pump outlet.

9. Transmission mechanism as set forth in claim 8, wherein said main pump chamber and hydraulic motor chambers are isolated from the other chambers by means of leakage limiting members.

10. Tramsmission mechanism as set forth in claim 9, wherein a force-feed pump housed in said main pump chamber is driven from the driving shaft of said main pump.

11. Transmission mechanism as set forth in claim 10, wherein a circulation pump disposed in said main pump chamber is driven from the driving shaft of said main pump and capable of filling the chambers of said main pump and hydraulic motors, respectively.

12. Transmission mechanism as set forth in claim 11, wherein the impeller plates of said hydraulic motors are fitted symmetrically to the ends of a shaft interconnecting said motors, said shaft being rigid with a pinion driving a differential crown wheel.

13. Transmission mechansim as set forth in claim 12, wherein said shaft interconnecting said hydraulic motors comprises a notched disc for the parking brake and a lever is disposed in the differential chamber and rigid with a shaft pivoting in said casing, said lever having one end adapted to engage one notch of said disc through an orifice interconnecting said differential chamber and said motor interconnecting shaft chamber.

14. Transmission mechanism as set forth in claim 11, wherein each one of said shafts of the two hydraulic motors comprises teeth in meshing engagement with a pinion rigid with the wheel driving members.

* * * * *